United States Patent

[11] 3,556,134

[72] Inventors Pierre Charles Jardinier
Gournay-sur-Marne;
Jack Paul Robert Simonnot, La Varenne,
France
[21] Appl. No. 692,937
[22] Filed Dec. 22, 1967
[45] Patented Jan. 19, 1971
[73] Assignee Societe D'Etudes et De Recherches De
Ventilation Et D'Aeraulique
Val de Marne, France
a corporation of France
[32] Priority Jan. 5, 1967
[33] France
[31] No. PV 120,405

[54] FLUID FLOW REGULATOR FOR USE IN THE VENTILATION DUCTS OF DWELLINGS
4 Claims, 7 Drawing Figs.
[52] U.S. Cl. ............................................. 137/499,
137/504
[51] Int. Cl. ............................................. F16k 31/16
[50] Field of Search ........................................ 137/504,
499

[56] References Cited
UNITED STATES PATENTS

| | | | |
|---|---|---|---|
| 1,343,162 | 6/1920 | Sherwen....................... | 137/499 |
| 2,415,674 | 2/1947 | Hoffman....................... | 137/499X |
| 3,068,892 | 12/1962 | Panning et al. ............... | 137/499 |
| 2,904,067 | 9/1959 | Johansson..................... | 137/499 |
| 2,911,002 | 11/1959 | Larkfeldt...................... | 137/499 |
| 3,068,891 | 12/1962 | Panning et al. ............... | 137/499 |

*Primary Examiner*—William E. Wayner
*Attorney*—Wilkinson, Mawhinney & Theibault

ABSTRACT: The disclosure of the present invention pertains to a regulator for maintaining a substantially constant and preset fluid flow in a ventilation duct of dwellings in which is employed a flap valve actuated by an airscrew, means for segregating the respective turbulence fields of the valve and airscrew to avoid interaction between the turbulences phenomena produced by the airscrew and the valve whereby irrespective of the valve position an airflow of constant rate applies constant torque to the airscrew and spring means are used to tend to move the flap valve to its fully open position.

INVENTORS
PIERRE CHARLES JARDINIER
JACK PAUL ROBERT SIMONNOT
By Cushman, Darby & Cushman
ATTORNEYS

INVENTORS
PIERRE CHARLES JARDINIER
JACK PAUL ROBERT SIMONNOT

BY Cushman, Darby & Cushman
ATTORNEYS

FLUID FLOW REGULATOR FOR USE IN THE VENTILATION DUCTS OF DWELLINGS

The present invention relates to a regulator for maintaining a virtually constant and preset fluid flow, more particularly in the ventilation ducts of dwellings.

In order to stabilize at a preset value the flow rate of a stream of air generated through a duct by natural draught or mechanical means, it has already been proposed to resort to devices consisting essentially of a passageway equipped with a flap or register which, responsively to downflow and upflow pressures, adjusts the section through which the stream of air generated by the difference between these pressures can flow, and of means for urging the register back to a position providing a preset degree of opening thereof.

The means for urging the register of devices in which the hinge axis thereof extends across the passageway consist of balancing means or a counterweight adapted to set up an oscillation period which, through a resonance phenomenon produced by the energy of an airstream, causes the register to "beat" and the airflow to thereby take place with the same period.

In order to avoid this drawback it has been proposed to use devices having a register adapted to pivot (coaxially with a passageway containing it) with respect to a seat, so as to form a valve which is impervious to the effect of the flow and is actuated by an airscrew mounted coaxially within said passageway.

However, whilst it is true that the position of the register in the passageway of flow regulators of this type—as for instance the regulator described in Canadian Pat. Ser. No. 565,567—does indeed avoid a direct action by the airstream capable of shifting the register (which may be subjected to constant torque restoring means), on the other hand the torque generated by a constant flow through the valve actuating airscrew exhibits a bell-shaped curve of variation with respect to the position of the valve register, and this curve not only corresponds to a range of stabilization of the air flow that is somewhat inaccurate and too narrow for routine applications, but also to nonnegligible sensitivity to oscillation phenomena outside this range.

The present invention relates to a flap valve regulator which is impervious to the effect of the flow through it and is actuated by an airscrew which, jointly with said flap, forms a compound coaxial with a duct surrounding the airscrew.

A regulator according to this invention includes means for segregating the respective turbulence fields of the valve and the airscrew. Such means manifestly avoid interaction between the turbulence phenomena produced by the airscrew and the valve, whereby, irrespective of the flap position, an airflow of constant rate applies a constant torque to the airscrew.

As a result, the airflow can be stabilized by restoring means applying constant torque throughout the valve adjustment range, regardless of whether the airscrew is positioned upflow or downflow of the valve.

It is a further teaching of this invention that the regulator includes means for selecting, within a predetermined range of flow rates, any desired flow rate to be stabilized by the flap valve.

Preferably, the stabilized flow rate selecting means comprise a bypass passage equipped with adjustment means of the cross section therethrough, whereby part of the stabilized flow passes through the bypass passage parallel to the remainder of the flow acting on the valve control airscrew, with the two flows passing simultaneously through the valve.

Since the valve-airscrew compound restoring torque has a unique value irrespective of the position of the flap on its seat, the mass flow through the airscrew will remain constant for each steady position of the flap, so that the stabilized air mass flow will be proportional to the cross-sectional setting of the bypass passage.

In order to permit of selecting the value of the stabilized fluid mass flow, the present invention further provides means for modifying as required the magnitude of the effect produced by the flow through the airscrew of the flow regulator described hereinabove.

Obviously, the greater the effect of the fluid on the airscrew, the smaller the flow rate value stabilized by such a regulator.

The invention further relates to a simple and inexpensive embodiment of a fluid flow regulator of the kind hereinbefore disclosed.

Other features and advantages of the invention together with the foregoing will be set forth in the following description of some possible embodiments, given with reference to the accompanying nonlimitative exemplary drawings, in which.

Figure 1:
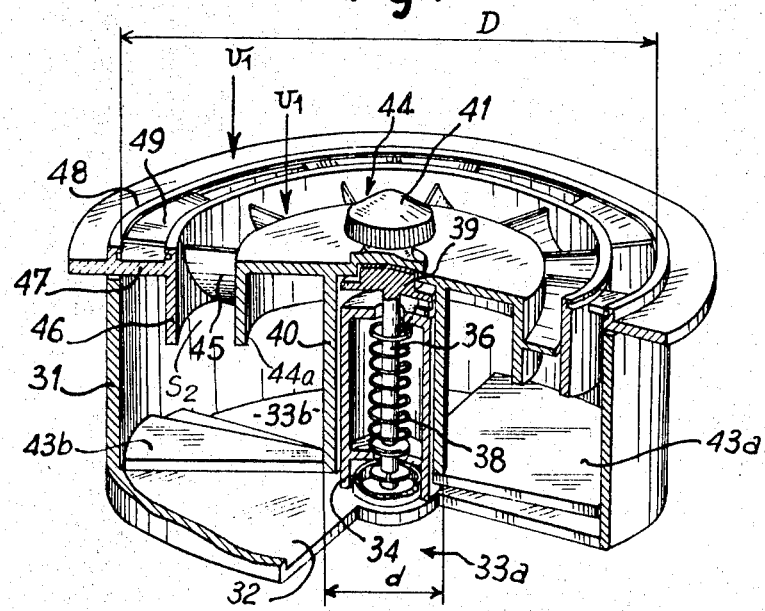
FIG. 1 shows in perspective with partial cutaway a fluid flow regulator according to the invention.

Referring first to FIG. 1, there is shown thereon a cylindrical housing, of which the sidewall 31 forms a duct of diameter D and the end wall 32 is formed with two diametrically opposed sector-shaped openings 33a and 33b therein, the angular aperture of each of which is substantially equal to 90°.

A central boss 34a integral with the end wall 32 has secured thereto as by a welding seam or glue line $x$ a sleeve 34 carrying two bearings 35a, 35b for locating a shaft 36 coaxially with said cylindrical housing.

Shaft 36 is retained in bearing 35a by two circlips 37a, located outside of bearing 35a, and 37b and extends through a helicoid spring 38 the ends of which are fixed respectively to circlip 37b and to the support for bearing 35b.

One end of shaft 36 protrudes from sleeve 34 and is formed with a head 39 made of magnetic metal with which is fast a cylindrical sheath 40 rigidly connected to a knob 41 having a permanent magnet 42 incorporated therein.

The inner end of the sheath 40 has formed integrally therewith or secured thereto two circle-sector-shaped vanes 43a and 43b located diametrically to one another. The sheath 40 at its opposite or outer end flanges outwardly to form a wheel 44 having a hub 44a which carries a plurality of aerodynamically contoured radial blades 45.

The blades 45 which constitute a turbine of wheel 44 are positioned within a passage $S_2$ defined by a cylindrical shell 46 and the hub 44a which shell 46, through the medium of identical equidistant spacers 47, is associated with a rim 48 positioned over the free edge of lateral housing wall 31.

Lastly, facing annular grooves are formed in the faces of cylindrical shell 46 and rim 48, respectively for retaining and guiding therealong a ring or wheel 49 embodying apertures matching the spacing between the spacers 47.

It is to be understood that housing 31-32, sleeve 34, and the compound consisting of sheath 40, sectors 43, wheel 44 and rimmed cylindrical sheel 48, can be obtained by suitable plastics mouldings.

Figure 2:
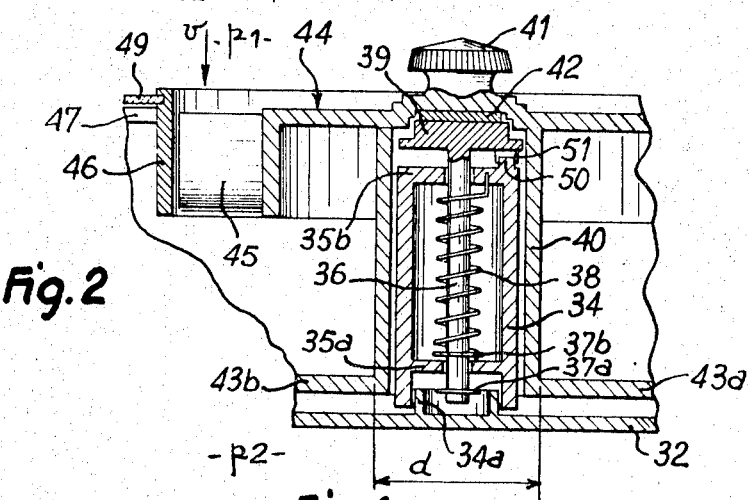
FIG. 2 shows in cross section on an enlarged scale a detail of the regulator of FIG. 1.

It will be appreciated that the vanes 43 and the wheel 44 form a balanced compound on the shaft 36; further, a stop 50 integral with sleeve 34 cooperates with a peg 51 rigidly secured with head 39, whereby as shown by FIG. 2, in the inoperative configuration, the positions of vanes 43 and 43b are such as to ensure complete uncovering of apertures 33a and 33b and a predetermined tension C in the spring 38. The properties of spring 38 in respect of size, shape and nature are such as to cause it to develop, after it has been tensioned for a certain number of revolutions, a practically constant torque over a further quarter turn.

In addition, the vanes 43 and the housing end wall 32 respectively form the active valve element and the seat of a valve adapted to be actuated by the airscrew formed by wheel 44, which valve is clearly insensitive to the effect of any airstream flowing through the passage bounded by housing sidewall 31, and it is an important teaching of this invention that the longitudinal dimensions of sheath 40 are such as to space airscrew 44 sufficiently from valve element 43 to segregate the respective turbulence fields of the airscrew and the valve in an airstream.

The theory of operation of the subject regulator of this invention, which is primarily intended as a discharge grille for ventilation circuits in dwellings, is as follows:

The turbine 45 is submitted to a constant returning couple (spring 38, FIGS. 1 and 2); therefore, that turbine can only act on the valve 43a, 43b in the direction of closing only after airflow passing through the turbine looses a sufficient amount of energy in order to balance that couple.

That part of energy (recovered by the turbine 45) is, therefore, constant after a certain value $d1$ of the difference of pressure $p1 - p2$ for which the valve 43a and 43b is completely opened.

Moreover FIGS. this difference of pressure $p1 - p2$ comes to value $d$ superior to that value $d1$ then the valve comes to position more and more closed (FIG. A massive flow Q1 filed herewith).

For value of $p1 - p2$ inferior to that value $d1$ the valve is opened and the massive flow varies in a conventional manner in function of that difference of pressure.

The apparatus with that fundamental principal (which is known by the cited references) is, therefore, possible to regulate to a constant value an air massive flow above a certain value $d1$ of the difference in pressure $p1 - p2$.

Actually that regulation can be done up to a value which is around 15 mm. (of water column) for which pressure the corresponding speed of the airflow generates noisy phenomena which cannot be accepted in a ventilation installation in livable buildings.

The species (FIGS. 1 and 2 of the application) presents moreover an angular opening (provided by the flange 46) the opening of which can be regulated by hand with a wheel 49.

That angular opening and wheel 46, 49 constitutes a means which permits to choose a massive flow in a predetermined range of a massive flow Q1 to QM FIG. A.

Each massive flow in this range can be regulated (with the system of the turbine 45 associated to the valve 43a, 43b) within the pressure range $d1$ to 15 mm. water column above mentioned.

In effect for a given value of the area of the opening 46 a certain massive flow, for instance, QM passes through opening 46 and turbine 45 and the valve 43a and 43b, that massive flow being regulated in function of the variation of the difference of pressure $p1 - p2$ as explained above.

A modification of the area of the opening 46, 49 is obviously without any effect on the pressure $p1$ and $p2$ downstream and upstream of the device but it modifies the condition of flow especially the velocity in the turbine 45 as well as the amount of energy transferred from the airflow to this turbine by a bypass principle as shown in FIG. C, filed herewith.

The massive flow through the valve 43a, 43b tends to vary (for instance, tends to increase) if the area of the opening is increased.

The difference in pressure $pi - p2$ or loss of charge in that valve tends to vary in the same way (for instance, to increase).

However, the pressure $p1$, $pi$ and $p2$ which can be measured on the beginning and on the end of the turbulence area of those elements (areas which are separated from one another) are such as $p1 - p2 = (p1 - pi) + (pi - p2) = d$ so the loss of charge $p1 - pi$ in the turbine tend to vary in the contrary way (for instance, to decrease). This modifies the balance of the turbine valve system (for instance, in the sense of the opening of the valve).

This system being pulled or pushed by the spring 38 to another position of balance for which the amount of energy transferred from the airflow to the turbine 45 equals the amount of energy transferred in the preceding position. The valve 43a, 43b then presents a degree of aperture appropriate to that of passage 46, 49, and after the disruptions to which it is subjected during these transient operating conditions, the pressure $pi$ reverts to its initial value.

Then the range in position of the wheel 49 corresponds to a range of couple value.

a. position of balance of the system 45, 43a and 43b
b. difference of pressure $d = p1 - p2$.

This insures the regulation of the massive flow from one up Q1 to another value QM within a permanent range of pressure ranging from $d1$ to 15 mm. of water column FIG. A.

The present apparatus can then be mounted on the network of conduits having the same sucking pressure $d$ in order to get in a number of rooms a number of massive flow which are stable and different one from each other. This result justified the merit of this invention.

Responsively to the difference between upflow and downflow pressures $p1$ and $p2$, an air mass flow Q flows through the unit, and a part thereof $q2$ acts upon airscrew 44 to operate valve element 43, which is urged into its open position by spring 38.

Figure 6:
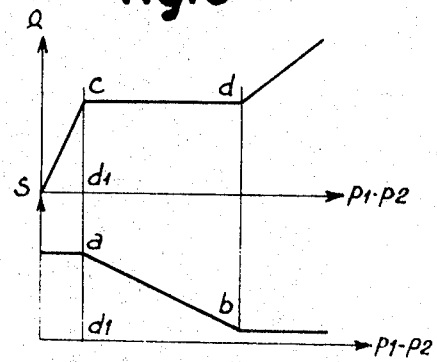
FIGS. 6 and 7 are explanatory diagrams of the principle of operation of the regulator shown in FIG. 1.

As long as $p1$ minus $p2$ remains below a value $d1$ (see FIG. 6), the force exerted by the flow $q2$ on the airscrew is insufficient to overcome the resistance of spring 38, so that the valve remains at maximum opening S; the mass flow Q is then an increasing function of $p1$ minus $p2$.

When the difference between $p1$ and $p2$ exceeds $d1$, the force exerted by the air mass flow $q2$ on airscrew 44 tends to close the valve, and, as $p1$ minus $p2$ increases, the section through the valve decreases (see curve portion a–b in FIG. 6) while the air mass flow Q stays constant (curve section c–d).

Figure 7:
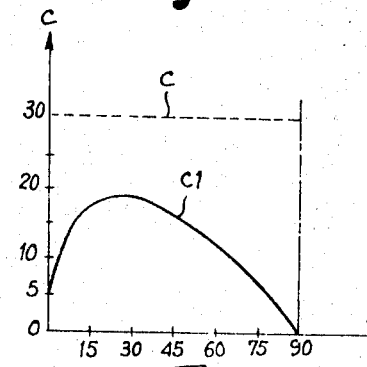

The valve element 43a will meanwhile have rotated through 90°. and, the turbulence fields of the valve element and the airscrew being segregated, tests show that the torque C applied by the airflow on airscrew 44 remains substantially constant over this 90° rotation (see FIG. 7). It must be pointed out that this is not so in the case of prior art regulators of similar type and dimensions, a case in point being the regulator described in the aforecited Canadian patent, for in these prior art devices the mutual parasite interaction of the turbulence fields of the valve element and the airscrew results in the bell-shaped torque curve C1 (FIG. 7).

Consequently, for any given constant value C of the restoring torque produced by spring 38 there is a corresponding set of torques dependent on the pressure differential $p1 - p2$ and on the cross-sectional aperture of the valve, with the mass flow therethrough remaining constant.

The mass flow Q through the valve is furthermore equal to the sum of the flow $q2$ through the airscrew 44 and $a1$ through the annular passage between sidewall 31 and cylindrical shell 46.

In addition, the velocity $v1$ of the flow on entry into the annular passage is substantially equal to the constant velocity on entry into the airscrew, and the mass flow $q1$ is proportional to $v1$ and to the section of the passage $s1$ bounded by the edges of the apertures in ring 49 and of the spacers 47.

Thus, rotation of the ring 49 makes it possible to adjust the mass flow Q within a range which is determined by the range of variation of $s1$.

The characteristics of a discharge grille for stabilizing a flow adjustable between rates of 30 and 60 cubic metres of air per unit time are given in the tables below.

| D (cm.) | d (cm.) | S (sq. cm.) |
| --- | --- | --- |
| 12 | 2 | 36 |

| Q (cu. m./hr.) | q1 | q2 | v1 (m./sec.) | s1 (sq. cm.) | s2 (sq. cm.) | C (g./cm.) |
| --- | --- | --- | --- | --- | --- | --- |
| 30 | 0 | 30 | 2.5 | 0 | 32 | 20 |
| 60 | 30 | 30 | 2.5 | 32 | 32 | 20 |

It should furthermore be noted that, for the rates normally accepted for ventilation purposes, a spacing of about 20 mm. between the airscrew and the vane or valve element 43 is sufficient to separate the turbulence fields therebetween. Further, it will be appreciated that the turbulence field of ring 49 is separated from those of the valve and the airscrew.

In this connection, it should be noted that while the spacing between the airscrew and the valve element can be small, it is necessary to segregate the turbulence fields therebetween.

Figure 5:
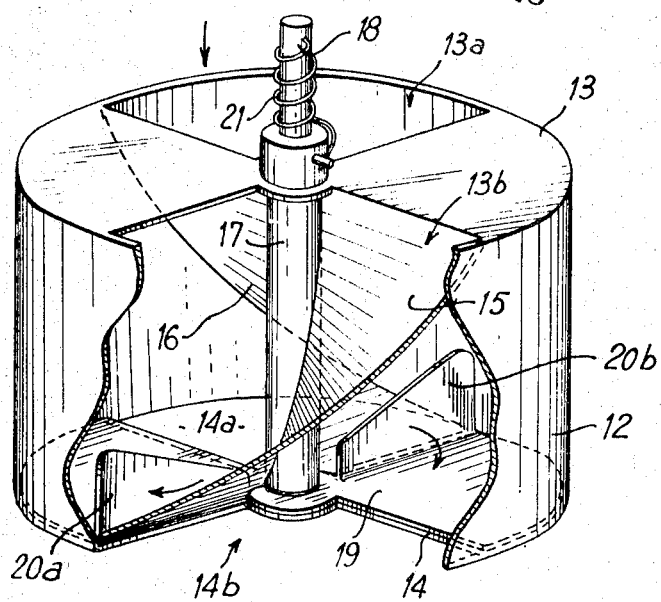

Thus, FIG. 5 shows a housing 12 with a sleeve 17 for the shaft 18 of a valve element 19 capable of adjusting the section through the apertures 14a, 14b in the housing end wall 14.

These various parts are similar to those of the regulator shown in FIG. 1, and operation of valve element 9 is effected, against countering spring 21, by the action of the airstream against the blades 20a20b fixed to the valve element.

As in the case of the aforesaid Canadian patent, the airscrew is thus integral with the valve element, but in this specific embodiment helicoid ramps 15 and 16 rigid with the sidewalls of housing 12 and sleeve 17 extend up to the boundary edges of the apertures 14a, 14b, and the blades 20a, 20b are mounted on the upflow edges of the valve element in order to separate the turbulence fields of the airscrew and the valve.

Further, the sleeve 34 protects the bearings of shaft 36 and its spring against dust deposits; moreover, the airscrew 44/valve element 43 compound and the rimmed cylindrical shell 46 can be separated from housing 31 to facilitate cleaning.

Obviously, regulators according to this invention can be adapted to a variety of utilization modes and in particular to suit the direction of the stabilized flow.

Figure 3:
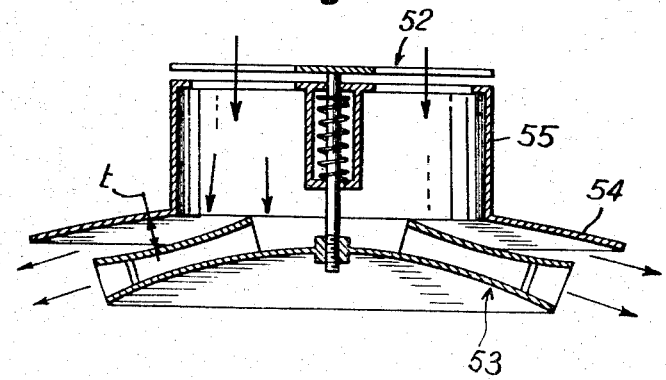

Thus the regulator shown in FIG. 3 is devised in the form of a diffuser to enable conditioned air to be blown into a room. It comprises a valve 52 the valve element and seat components of which are positioned, with respect to the direction of flow of the airstream, upflow of a wheel 53 of the centrifugal type adapted to operate the said valve in the manner explained hereinabove.

To ensure proper diffusion, this regulator comprises a divergent passage bounded by one of the walls of said wheel and by the wall of a bell mouth 54 forming an extension of the cylindrical wall of a duct 55.

In order to permit convenient adjustment of the section $t$ through the passage, means for fixing the wheel 53 are provided on the valve shaft to permit adjustment of the longitudinal position thereof on its shaft, an example of such means being a screw cooperating with nuts and locknuts.

Figure 4:
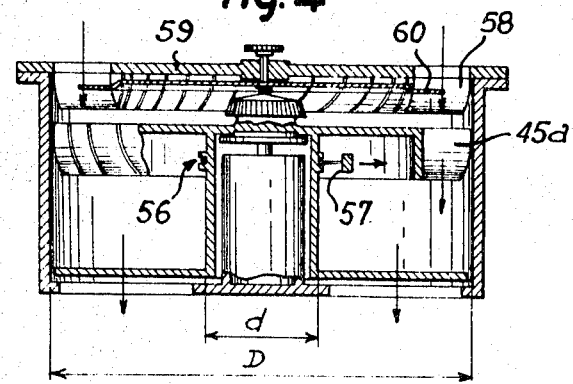
FIGS. 3 to 5 are showings, respectively in axial section and in perspective, of three alternative constructional forms of a fluid flow regulator according to the invention.

In addition, the magnitude of the air mass flow stabilized by such a regulator can be adjusted by modifying the extent of the effect of the flow on the regulator's airscrew. Thus FIG. 4 shows an arrangement in which a ring of blades 58 is pivotally mounted on a support 59 so that the rings may be simultaneously and identically controlled by a ring of forks 60 in order to vary the incidence of the air flow on the airscrew blades 45a.

A similar result could alternatively be obtained by utilizing an airscrew the blade pitch of which can be adjusted as required by suitable control means.

It goes without saying that many changes and substitutions of parts may be made to the specific forms of embodiment hereinbefore described, without departing from the spirit and cope of the invention.

We claim:

1. A fluid flow regulator for stabilizing, within a predetermined valve adjustment range, the flow rate of a fluid stream at a practically constant value unaffected by changes in the pressure of said fluid stream, said regulator comprising a housing defining a duct, a transverse valve element associated coaxially with said duct, a valve seat cooperating with said valve element to form flow regulating valve means, said valve element having airscrew means coaxially associated therewith for affecting the degree of opening of said valve means, said airscrew means having a shaft and a hub means, said housing being attached to said valve seat, said shaft and hub means connecting the airscrew means to the valve element, resilient means connected to the valve seat on the one hand and to said shaft on the other hand in order to apply their action to said shaft for urging the valve element toward a preset degree of opening, said resilient means generating a constant moment for stabilizing said flow over the entire valve adjustment range, said airscrew means and said valve means being spaced apart to set up respective fields of turbulence, means connected to said housing for separating the respective turbulence fields of said valve and said airscrew; and means for adjusting the fluid passage between the means for separating and the housing, said means for separating establishing two end openings defined by the housing and the means for separating, one of said openings being disposed between the valve means and the airscrew, the other opening being disposed on the other side of the airscrew.

2. An apparatus according to claim 1, characterized in that the means for adjusting the fluid passage comprise adjustable closure means to close the space between the means for separating and the housing.

3. A regulator according to claim 1 characterized in that the valve element comprises a cylindrical sheath, two radially extending sector-shaped members, the sector-shaped members being rigid with one end of said sheath, said airscrew comprising contoured blades integral with said hub, said hub being rigidly connected with the other end of the sheath and comprising means for securing it to the shaft, and said shaft being pivotally mounted inside said sheath.

4. A regulator according to claim 3, characterized in that the end of the shaft adjacent the airscrew comprises a magnetic head and the airscrew hub means comprises a permanent magnet for attraction to the magnetic hub.